United States Patent [19]

Miyasako

[11] Patent Number: 4,774,580
[45] Date of Patent: Sep. 27, 1988

[54] VIDEO SIGNAL CONTROL APPARATUS

[75] Inventor: Yoji Miyasako, Yokohama, Japan

[73] Assignee: Kabushiki Kaisha Toshiba, Kawasaki, Japan

[21] Appl. No.: 110,735

[22] Filed: Oct. 21, 1987

[30] Foreign Application Priority Data

Mar. 17, 1987 [JP] Japan .................................. 62-61974

[51] Int. Cl.[4] ........................ H04N 5/14; H04N 5/262
[52] U.S. Cl. .................................. 358/169; 358/181; 358/147
[58] Field of Search ............... 358/169, 146, 147, 168, 358/181

[56] References Cited

U.S. PATENT DOCUMENTS

| | | | |
|---|---|---|---|
| 3,558,815 | 1/1971 | Banks | 358/181 |
| 3,914,545 | 10/1975 | Engel | 358/169 |
| 4,253,110 | 2/1981 | Harwood et al. | 358/169 |
| 4,319,278 | 3/1982 | Shimizu | 358/181 |
| 4,463,371 | 7/1984 | Lewis, Jr. | 358/13 |
| 4,488,179 | 12/1984 | Krüger et al. | 358/181 |
| 4,587,554 | 5/1986 | Tamura et al. | 358/168 |
| 4,642,690 | 2/1987 | Hinn | 358/169 |

Primary Examiner—James J. Groody
Assistant Examiner—John K. Peng
Attorney, Agent, or Firm—Finnegan, Henderson, Farabow, Garrett & Dunner

[57] ABSTRACT

A video signal control apparatus disclosed herewith stores, in a memory, contrast control data that is output from a video operation unit, reads out the control data from the memory during a vertical retrace period in which no image is output, and performs contrast control within the vertical retrace period based on the control data.

10 Claims, 4 Drawing Sheets

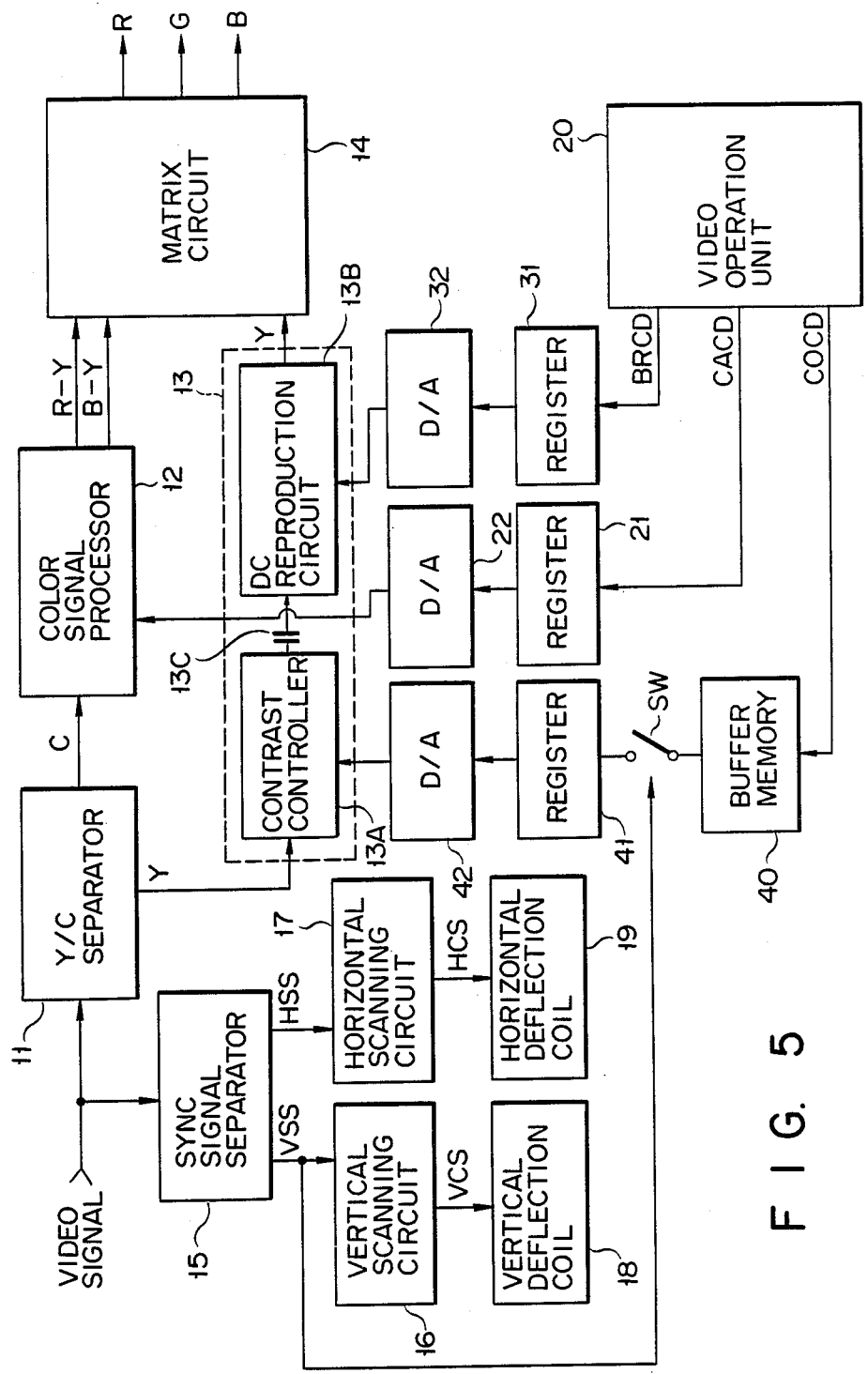
F I G. 5

4,774,580

VIDEO SIGNAL CONTROL APPARATUS

BACKGROUND OF THE INVENTION

The present invention relates to a video signal control apparatus that controls a video signal from a television tuner, a VTR (video tape recorder) or the like to adjust the conditions of a video image indicating information of the video signal.

Typically, a signal processing device for use in a television, VTR, etc. employs the system that separates a video signal into a color signal and a luminance signal, which are in turn subjected to separate signal processings, and then mixes these processed signals to provide a composite video signal to be output to a CRT (cathode ray tube). Based on control data generated by a viewer controlling a video operation unit, a color signal processing unit performs color control while a luminance signal processing unit performs contrast control and brightness control. The luminance signal processing unit varies the AC component (amplitude) of the luminance signal to control the contrast and then causes a DC reproduction circuit to control the brightness.

When the contrast control is effected by considerably varying the amplitude of the luminance signal, however, the large change in amplitude is likely to vary the DC level of the luminance signal where the amplitude control is effected. The change in DC level of the luminance signal causes a partial brightness change on the screen so that a portion or some portions of the screen appears brighter or darker than other portions. This phenomenon occurs due to a delay in pedestal level control when the amplitude of the luminance signal is greatly changed. The delay in the pedestal level control results from the fact that the time constant of the DC reproduction circuit is typically set large in order to suppress a change in the brightness of the screen in a horizontal period.

SUMMARY OF THE INVENTION

With the above circumstance in mind, it is an object of this invention to provide a video signal control apparatus which is improved to overcome the problem of causing a partial brightness change (noise) on the screen at the time contrast is controlled, so as to be free of noise when a video signal is processed for various image controls, thus always providing a stable video.

According to one embodiment of this invention, there is provided a video signal control apparatus which comprises:

a control data storage circuit for storing control data of an AC component of a video signal produced from a video operation unit;

a data readout circuit for reading out the control data from the control data storage circuit during a vertical retrace period in which no image is output; and an AC component control circuit for varying the AC component of the video signal based on the control data read by the data readout circuit, whereby the status of a video image can be adjusted by varying the DC and AC components of the video signal.

With the above arrangement, the control data of the AC component of a video signal from the video operation unit is stored in the control data storage circuit and is read out therefrom during a vertical retrace period in which no image is output, and the AC component of the video signal is controlled during the vertical retrace period based on the read control data. Accordingly, even when the DC level of a luminance signal varies upon changing the AC component of the video signal, it is possible to prevent a partial brightness variation from occurring on the screen because the change in DC level of the luminance signal does not occur during an image output period.

BRIEF DESCRIPTION OF THE DRAWINGS

FIG. 4 is a block diagram showing another arrangement of the vertical scanning circuit used in the apparatus of FIG. 1; and FIG. 5 is a block diagram depicting a video signal control apparatus according to another embodiment of this invention.

DETAILED DESCRIPTION OF THE PREFERRED EMBODIMENTS

Figure 1:
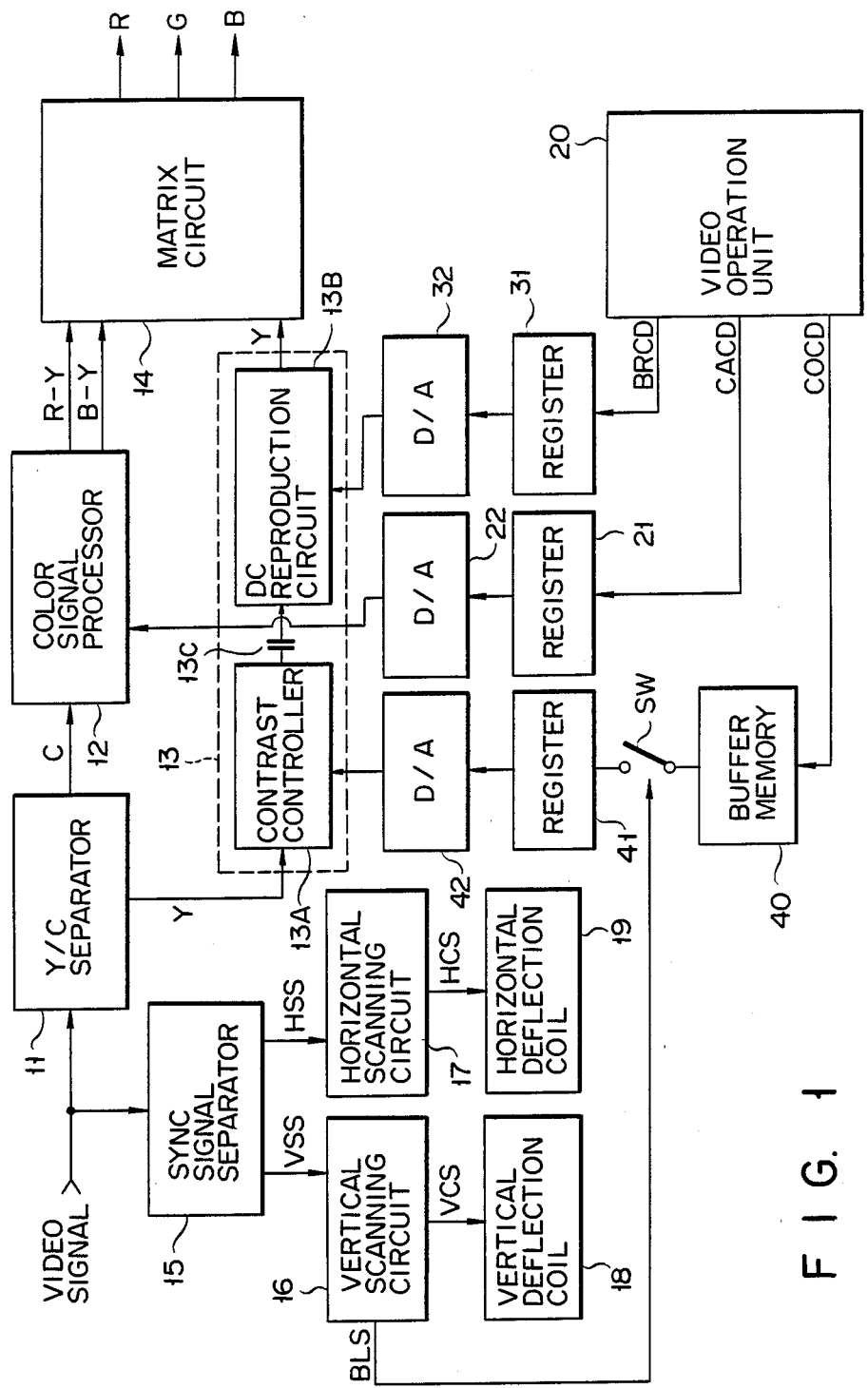
FIG. 1 is a block diagram of a video signal control apparatus according to one embodiment of this invention.

FIG. 1 illustrates a video signal control apparatus according to one embodiment of this invention. A video signal is supplied to Y/C separator 11 and sync signal separator 15. The video signal sent to Y/C separator 11 is separated into luminance signal Y and color signal C. Color signal C is supplied to color signal processor 12 where it is demodulated to provide color difference signals R-Y and B-Y. Luminance signal Y is supplied to luminance signal processor 13 where contrast control and brightness control are performed. This luminance signal processor 13 has contrast controller 13A, DC reproduction circuit 13B and capacitor 13C which couples the former two components 13A and 13B. Contrast controller 13A varies the amplitude of luminance signal Y to adjust the contrast. DC reproduction circuit 13B reproduces the DC component of luminance signal Y that is lost by capacitor 13C and adjusts the pedestal level of signal Y to a predetermined level, thereby executing brightness control. Luminance signal Y output from DC reproduction circuit 13B and color difference signals R-Y and B-Y attained in color signal processor 12 are supplied to matrix circuit 14 and are mixed there to provide R, G and B signals. These R, G and B signals are supplied to a CRT.

The color control in color signal processor 12, the contrast control in contrast controller 13A and the brightness control in DC reproduction circuit 13B are executed respectively on the basis of color control data CACD, contrast control data COCD and brightness control data BRCD which are generated by a viewer operating video operation unit 20. More specifically, color control data CACD output from video operation unit 20, when it is operated, is latched by register 21, and the latched data CACD is supplied to digital-to-analog (D/A) converter 22 where it is converted into an analog signal to be supplied to color signal processor 12. Similarly, brightness control data BRCD output from video operation unit 20 is latched by register 31, and is then supplied to D/A converter 32 which in turn converts the data into an analog signal and sends it to DC reproduction circuit 13B.

Contrast control data COCD also output from video operation unit 20 is latched by buffer memory 40. The output of buffer memory 40 is supplied through switch SW to register 41 and is latched there. Contrast control data COCD latched by register 41 is supplied to D/A converter 42 which in turn converts the data into an analog signal and sends it to contrast controller 13A.

Sync signal separator 15 extracts vertical sync signal VSS and horizontal sync signal HSS from the received video signal. Vertical sync signal VSS is supplied to vertical scanning circuit 16 while horizontal sync signal HSS is supplied to horizontal scanning circuit 17. Vertical scanning circuit 16 outputs vertical scanning signal VCS to vertical deflection coil 18. Signal BLS corresponding to the vertical retrace period and used in circuit 16 is supplied to switch SW to control the switching operation thereof. Horizontal scanning circuit 17 outputs horizontal scanning signal HCS to horizontal deflection coil 19. An electron beam emitted from an electron gun is swept by these two deflection coils 18 and 19.

Figure 2:
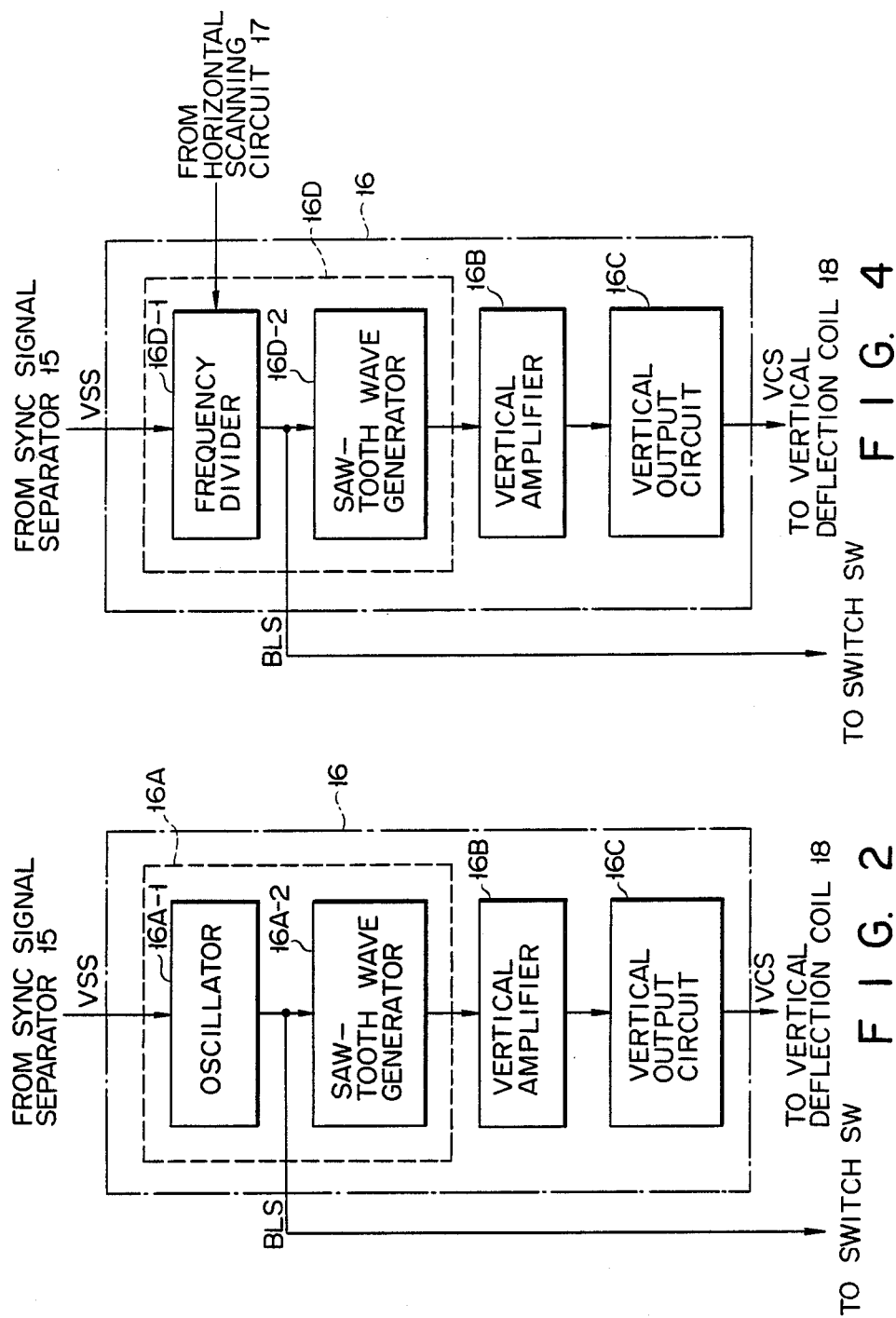
FIG. 2 is a block diagram illustrating an arrangement of a vertical scanning circuit used in the apparatus shown in FIG. 1.

FIG. 2 exemplifies the arrangement of vertical scanning circuit 16 of the apparatus shown in FIG. 1. Vertical scanning circuit 16 comprises vertical oscillation circuit 16A, vertical amplifier 16B and vertical output circuit 16C. Vertical oscillation circuit 16A comprises oscillator 16A-1 and saw-tooth wave generator 16A-2. Oscillator 16A-1 generates pulse signal BLS which is in synchronism with vertical sync signal VSS from sync signal separator 15. Pulse signal BLS is supplied to saw-tooth wave generator 16A-2 and switch SW. Based on pulse signal BLS, saw-tooth wave generator 16A-2 produces a voltage with a saw-tooth waveform in synchronism with sync signal VSS. The saw-tooth wave voltage is supplied to vertical amplifier 16B where it is amplified and is compensated for its linearity. The output of vertical amplifier 16B is supplied to vertical output circuit 16C for further amplification and linearity compensation. As a result, vertical scanning signal VCS is generated from circuit 16C. This signal VCS is then supplied to vertical deflection coil 18.

With the above-described arrangement, the supply of contrast control data COCD from buffer memory 40 to register 41 is executed when switch SW is turned on in response to pulse signal BLS from oscillator 16A-1. The timing at which this switch SW is turned on is synchronized with the vertical retrace period so that during the same period contrast control data COCD is transferred from buffer memory 40 to register 41. Therefore, the amplitude control for luminance signal Y is done only during the vertical retrace period by contrast controller 13A.

Figure 3:
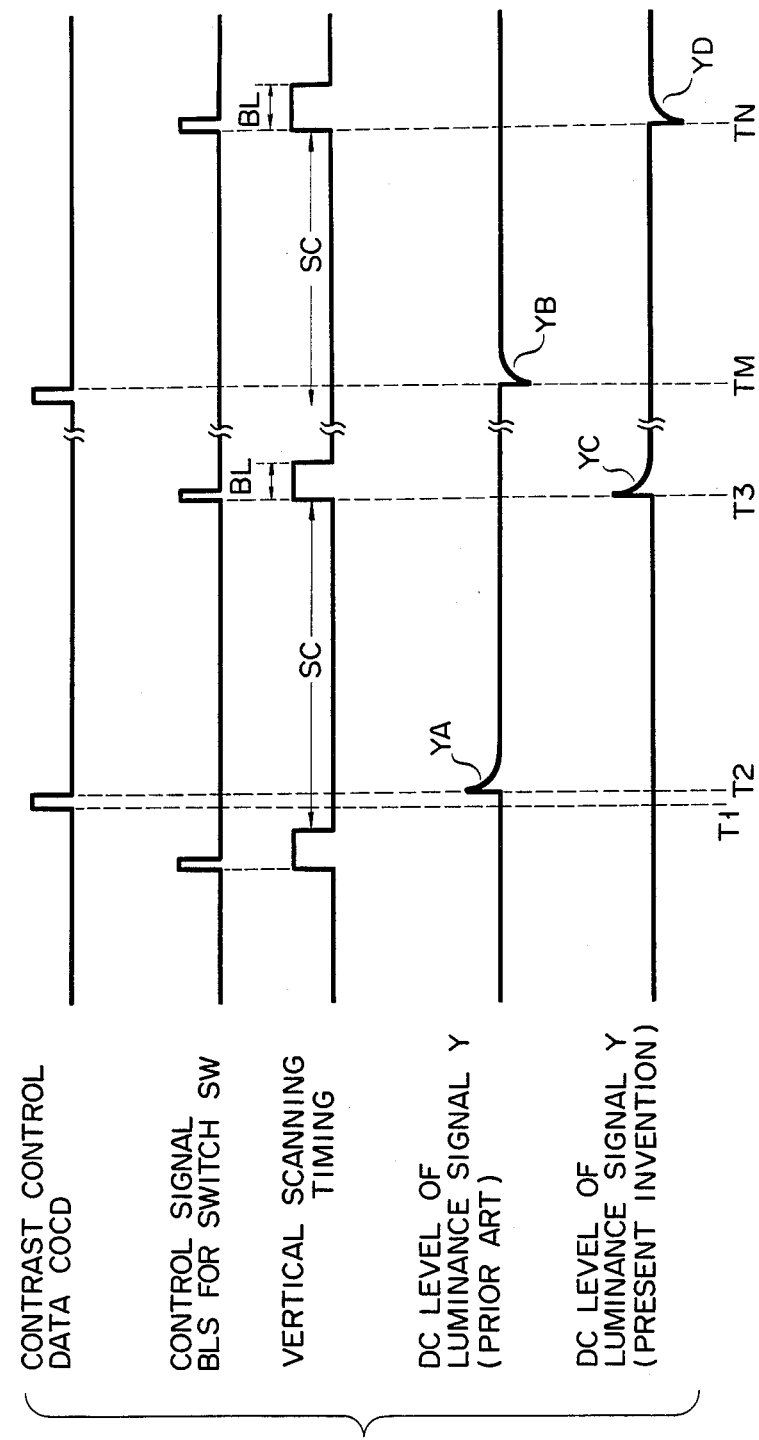
FIG. 3 is a timing chart for explaining the operation of the apparatus of FIG. 1 in comparison with the operation of a conventional video signal control apparatus.

Referring now to the timing chart of FIG. 3, the contrast control will be explained in detail. When the viewer operates video operation unit 20 for contrast control, contrast control data COCD is output from unit 20 (at time T1). According to conventional video signal control apparatuses, the contrast controller executes the contrast control at time T2 when the output of contrast control data COCD ends. This varies the DC level of the luminance signal (see point YA) during vertical scanning period SC to thereby partially change the brightness on the CRT screen. The same occurs at point YB at time TM. In contrast, according to the video signal control apparatus having the arrangement as shown in FIG. 1, contrast control data COCD generated by the operation of video operation unit 20 is supplied to buffer memory 40 for storage. At that time, if the generation period of contrast control data COCD falls within vertical scanning period SC, control signal BLS for switch SW is at an "L" level and switch SW is OFF. Consequently, contrast control data COCD is retained in buffer memory 40. When control signal BLS synchronized with vertical retrace period BL has an "H" level at time T3, switch SW is turned on so as to transfer contrast control data COCD from buffer memory 40 to register 41. Contrast control data COCD transferred to register 41 is then sent to D/A converter 42 for D/A conversion. The resultant analog data is supplied to contrast controller 13A and is used there for contrast control. The contrast control varies the amplitude of luminance signal Y. At this time, when the time constant of DC reproduction circuit 13B is large, the DC level of luminance signal Y changes (see point YC). Since this change in DC level occurs within vertical retrace period BL, however, the brightness of the CRT screen does not change. As a change in DC level of luminance signal Y, caused at time TM due to contrast control data COCD being output from video operation unit 20 at time TN, occurs within vertical retrace period BL as indicated by point YD, no brightness change happens on the CRT screen.

With the aforementioned arrangement, since the contrast control is always performed within the vertical retrace period irrespective of when video operation unit 20 is operated by the viewer, the brightness change on the CRT screen does not occur, thus ensuring that a stable video image can always be provided.

While this embodiment has been described and illustrated with reference to the case where control data CACD, COCD and BRCD produced from video operation unit 20 are digital data, these control data may be analog data having step values. In addition, while vertical oscillation circuit 16A in this embodiment has oscillator 16A-1 and saw-tooth wave generator 16A-2, this oscillator 16A-1 may be replaced by frequency divider 16D-1 as shown in FIG. 4. This frequency divider 16D-1 frequency-divides horizontal scanning signal HCS from horizontal scanning circuit 17 to produce pulse signal BLS that is in synchronism with vertical sync signal VSS from sync signal separator 15. This pulse signal BLS is supplied to saw-tooth wave generator 16D-2 and is also supplied to switch SW as the switch control signal. This modified arrangement can perform the same function and produce the same effects as the arrangement shown in FIG. 2.

FIG. 5 illustrates a video signal control apparatus according to another embodiment of this invention. In FIG. 5 the same reference numerals as are used to denote the structural elements in FIG. 1 are used to specify similar or corresponding elements for ease of understanding. While the operation of switch SW is controlled by signal BLS generated from vertical scanning circuit 16 according to the embodiment illustrated in FIG. 1, the same switching operation is controlled by vertical sync signal VSS generated from sync signal separator 15 according to the embodiment of FIG. 5. The arrangement of FIG. 5 can close switch SW only during the vertical retrace period as per the arrangement of FIG. 1. With a video signal coming in, therefore, the apparatus illustrated in FIG. 5 can perform the same function and produce the same effects as the one shown in FIG. 1.

What is claimed is:

1. A video signal control apparatus for controlling a status of a video image by varying DC and AC components of a video signal, said apparatus comprising:
   a video operation unit;
   control data storage means for storing control data of an AC component of a video signal produced from said video operation unit;
   data readout means for reading out said control data from said control data storage means during a vertical retrace period in which no image is output; and
   AC component control means for varying said AC component of said video signal based on said control data read by said data readout means 2. The video signal control apparatus according to claim 1, wherein said control data of said AC component of said video signal is contrast control data.

3. The video signal control apparatus according to claim 1, wherein said control data storage means includes a buffer memory.

4. The video signal control apparatus according to claim 1, wherein said data readout means includes a switch which is turned on during said vertical retrace period and is turned off during a vertical scanning period.

5. The video signal control apparatus according to claim 4, wherein said apparatus further comprises a vertical scanning circuit for producing a control signal and a switching operation of said switch is controlled by said control signal produced in said vertical scanning circuit.

6. The video signal control apparatus according to claim 5, wherein said vertical scanning circuit comprises an oscillator, a saw-tooth wave generator, a vertical amplifier and a vertical output circuit, and an output of said oscillator is used as said control signal for said switch.

7. The video signal control apparatus according to claim 5, wherein said vertical scanning circuit comprises a frequency divider, a saw-tooth wave generator, a vertical amplifier and a vertical output circuit, and an output of said frequency divider is used as said control signal for said switch.

8. The video signal control apparatus according to claim 4, wherein said apparatus further comprises a sync signal separator for separating a vertical sync signal from said video signal and a switching operation of said switch is controlled by said vertical sync signal.

9. The video signal control apparatus according to claim 1, wherein said AC component control means includes a contrast controller.

10. The video signal control apparatus according to claim 1, wherein said AC component control means includes a register, a digital-to-analog converter for performing a digital-to-analog conversion of data latched in said register and a contrast controller which is supplied with an output of said digital-to-analog converter.

* * * * *